March 16, 1965 S. ADLER 3,173,820
APPARATUS FOR PRODUCING AND CONTOUR-MOLDING
NON-WOVEN FIBROUS PRODUCTS
Filed March 7, 1960 4 Sheets-Sheet 1
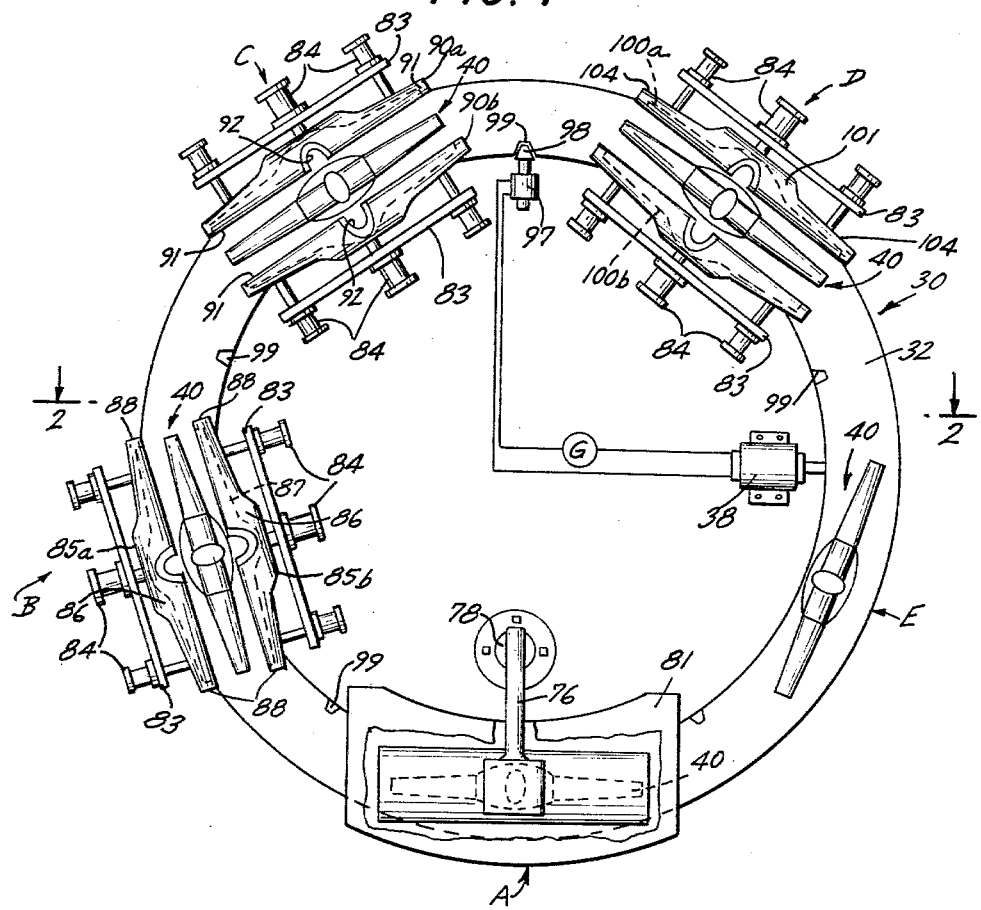
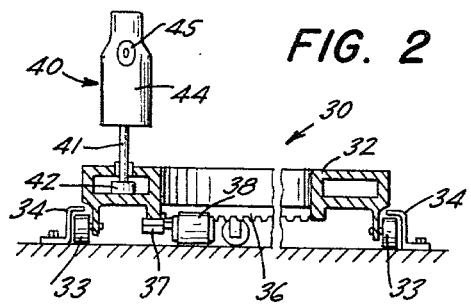
INVENTOR.
SOLOMON ADLER
BY Percy Freeman
ATTORNEY March 16, 1965 S. ADLER 3,173,820
APPARATUS FOR PRODUCING AND CONTOUR-MOLDING
NON-WOVEN FIBROUS PRODUCTS
Filed March 7, 1960 4 Sheets-Sheet 2

INVENTOR.
SOLOMON ADLER
BY Percy Freeman
ATTORNEY

March 16, 1965 S. ADLER 3,173,820
APPARATUS FOR PRODUCING AND CONTOUR-MOLDING
NON-WOVEN FIBROUS PRODUCTS
Filed March 7, 1960 4 Sheets-Sheet 3

INVENTOR.
SOLOMON ADLER
BY Percy Freeman
ATTORNEY

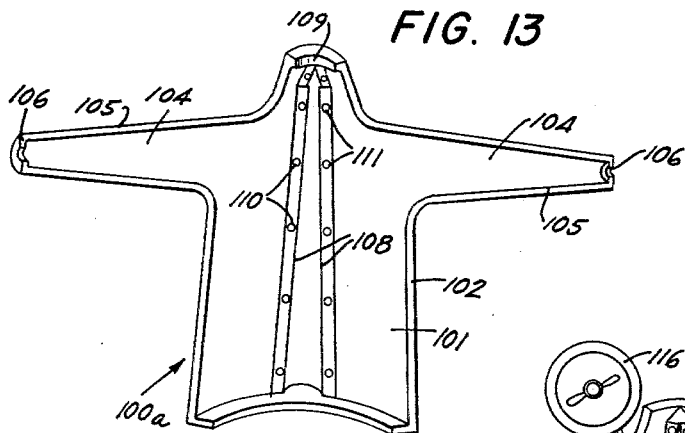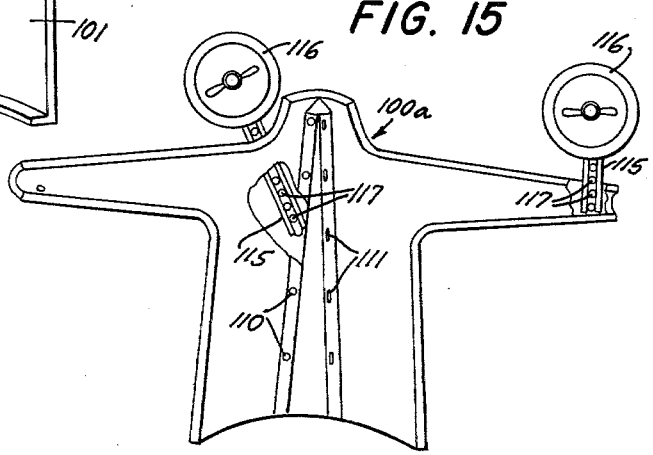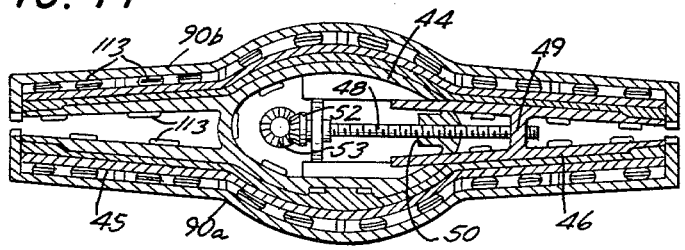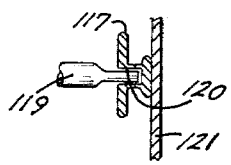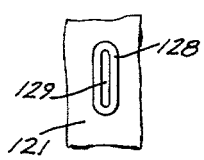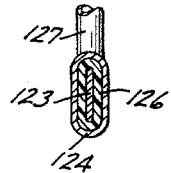

United States Patent Office 3,173,820
Patented Mar. 16, 1965

3,173,820
APPARATUS FOR PRODUCING AND CONTOUR-MOLDING NON-WOVEN FIBROUS PRODUCTS
Solomon Adler, Kew Gardens, N.Y., assignor to Hypo Surgical Supply Corp., New York, N.Y., a corporation of New York
Filed Mar. 7, 1960, Ser. No. 13,185
5 Claims. (Cl. 156—369)

This invention relates to apparatus for manufacturing non-woven fibrous products and, more particularly, to apparatus for manufacturing a garment from such non-woven fabric material.

Ordinarily, any non-woven fabric material that is used to manufacture a product, such as a garment, must first be cut, sewed, and finished in almost as many operations as is required for the manufacture of such products from woven fabrics. Such individual finishing operations are not only expensive and time-consuming, but also limit the design and finished appearance of the article. It is, therefore, an object of the present invention to provide apparatus for constructing a finished product, such as a garment, directly from fibre particles so as to facilitate the production thereof without unnecessary costly weaving, cutting, assembling, and sewing operations.

Still another object of the present invention is to provide apparatus for contour forming and molding a fibrous fabric into a desired shape without sacrificing the appearance or desirable functional features thereof.

A further object of the present invention is to provide apparatus for forming and molding fibrous material into a desired product of various thicknesses, patterns and forms, so that areas of greater stress and wear may be reinforced to any desired extent.

A still further object of the present invention is to provide apparatus for completely fabricating a garment from fibrous particles which can be dyed in a finished state, thus making it possible to use a staple raw material in a most efficient and effcetive manner.

Still another object of the present invention is to provide apparatus for manufacturing a garment which does not require a separate finishing or pressing operation after the completion thereof, but which is automatically blocked and pressed during its formation.

A more specifice object of the present invention is to provide apparatus for producing a garment which can be conveniently decorated with attractive designs and embossed patterns during one of its phases of production.

Another specific object of the present invention is to provide apparatus for forming buttonholes in and applying buttons to a non-woven fabric made in accordance with the present invention.

All of the foregoing and still further objects and advantages of this invention will become apparent from a study of the following specification, taken in connection with the accompanying drawing, wherein:

FIG. 1 is a top plan view, parts broken away, of apparatus for manufacturing articles from a non-woven fabric in accordance with the present invention.

FIG. 2 is a fragmentary cross-sectional view of certain parts of the assembly shown in FIG. 1.

FIG. 13 is a view similar to FIG. 12, of a trimming matrix forming still another part of the present invention.

FIG. 14 is an enlarged longitudinal cross-sectional view, similar to FIG. 7, of the embossing matrix station, partly shown in FIG. 12, in actual use.

FIG. 15 is a front plan view, with parts broken away, of button mounting means for applying buttons automatically to an article made in accordance with the present invention in association with the trimming matrix illustrated in FIG. 13.

FIG. 16 is an enlarged cross-sectional view of certain parts of the button applying apparatus shown in FIG. 15, diagramamtically illustrating the manner in which buttons are applied to a product made in accordance with the present invention.

FIG. 17 is a fragmentary plan view of a garment having a buttonhole formed in accordance with another feature of the present invention.

FIG. 18 is a sectional view of apparatus for forming buttonholes of the type shown in FIG. 17, as seen in the direction of the arrows on line 18—18 of FIG. 19.

Figure 3:
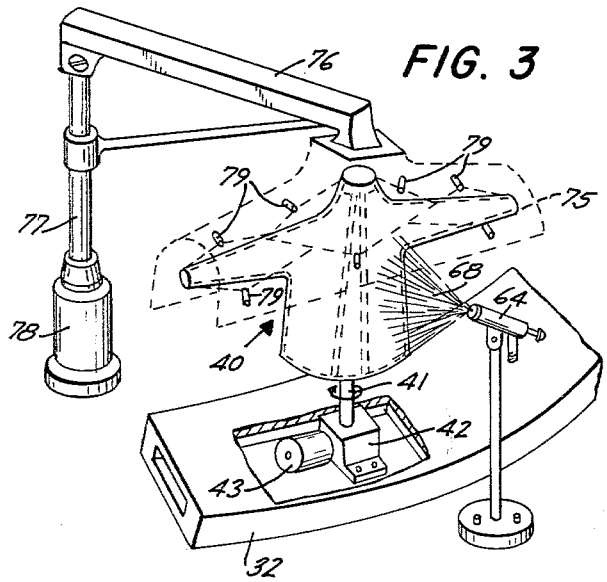
FIG. 3 is an enlarged fragmentary perspective view, with parts broken away, of a particle spraying station forming a part of the present invention.

Referring now more in detail to the drawing, and more particularly to FIGS. 1 and 2 thereof, apparatus 30 made in accordance with the present invention is shown to include a substantially annular frame 32 of hollow construction, mounted upon a set of wheels 33 for rotation about a central axis. A trackway 34 guides the wheels 33 to rotate the frame 32 in the manner prescribed.

A rack gear 36 depending from the frame 32 is meshingly engaged by a drive pinion 37 mounted upon the drive shaft of a motor 38 which may be energized by any suitable source G. Thus, in response to energization of the motor 38, the pinion 37 is operative to drive or rotate the frame 32 through a prescribed distance.

A predetermined number of substantially identical male forms 40 are mounted in circumferentially spaced apart relationship upon the frame 32. The particular number of such male forms 40 on each frame 32 is determined by the number of forming and finishing stations through which the product to be manufactured is to be moved. Each such male form 40 is mounted upon a vertical shaft 41 having its lower end connected to a gear box 42 within the hollow frame 32. As is shown in FIG. 3 of the drawing, a motor 43 supplies driving power to each individual shaft 41 to rotate the associated male form 40 at prescribed times.

Figure 7:
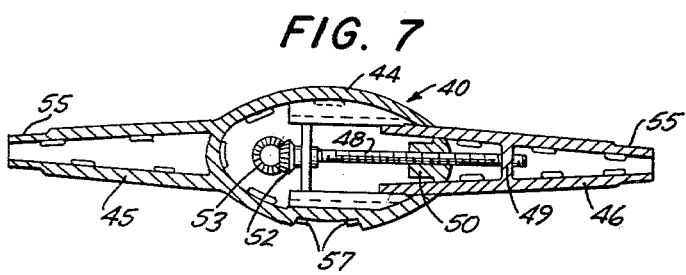
FIG. 7 is an enlarged longitudinal cross-sectional view taken along line 7—7 of FIG. 5.
Figure 8:
FIG. 8 is an enlarged fragmentary cross-sectional view taken along line 8—8 of FIG. 6, showing a pleat formed in a garment made in accordance with the present invention.
Figure 9:
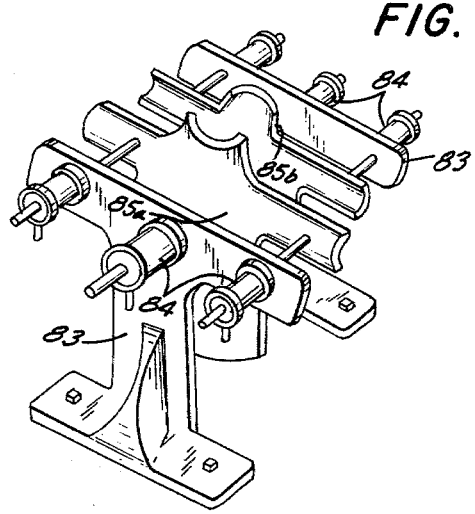
FIG. 9 is an enlarged perspective view of a pressing station forming still another part of the present invention, which apparatus compacts the particles applied to the male form by the spray station illustrated in FIG. 3.
Figure 10:
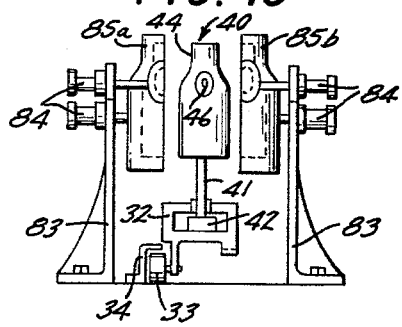
FIG. 10 is an end view of the apparatus shown in FIG. 9 with a male form positioned between the opposite sides thereof.

Each male form 40 includes a main body portion 44 and, in the process of manufacturing a garment, may include outwardly stretched arms 45, 46, one of such arms 46 being telescopically supported upon the main portion 44 for reciprocating longitudinal movement between fixed limits. Such movement of one of the arms 46 thus facilitates the release of the garment from the male form after the finishing operation. As is more clearly shown in FIG. 7 of the drawing, a threaded shaft 48 extends through the telescoping arm 46, is rotatably connected at one end to a bearing portion 49 within the interior of the arm 46, and is threadedly engaged within an inwardly threaded sleeve 50 carried by the main portion 44. The opposite end of the shaft 48 is connected to a bevel gear 52 meshingly engaged with a drive gear 53 that may be rotated in any suitable manner, such as by a hand crank, in order to retract and extend the adjustable arm 46 as may be required.

Figure 5:
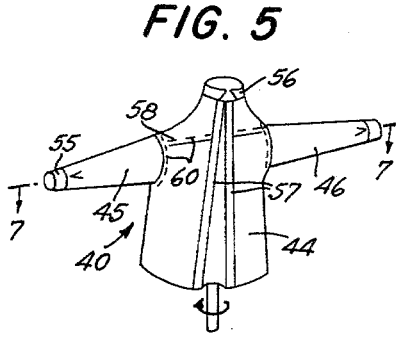
FIG. 5 is a front perspective view of a male form forming another part of the present invention.
Figure 6:
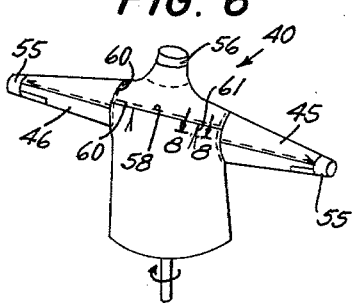
FIG. 6 is a rear perspective view of the male form shown in FIG. 5.

As is clearly shown in FIGS. 5 and 6 of the drawing, various portions of the male form may be provided with recesses in order to allow for reinforced garment areas in a manner hereinafter more fully described, when the fibrous particles are sprayed on to the male form. While such recesses have been shown to include cuff recesses 55, a collar recess 56, shirt front recesses 57, yoke recesses 58, simulated seam recesses 60, and pleat recesses 61, it will be appreciated that other forms and types of recesses may be included wherever it is desired to provide a built up or reinforced layer area for wear, comfort, or design purposes. The provision of the pleat recess 61 allows for the formation of pleats 62 in the finished garment which yield a better and more comfortable fit.

Figure 4:
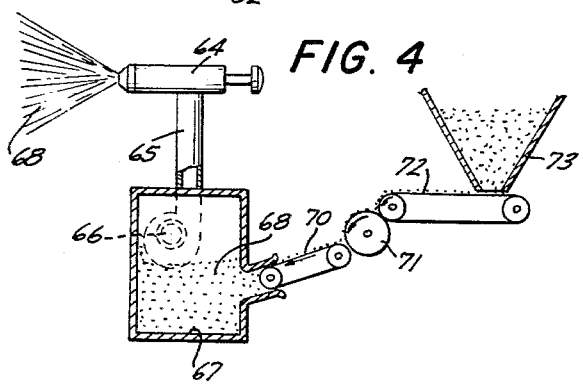
FIG. 4 is a diagrammatic view of apparatus for supplying fibres to the spraying station shown in FIG. 3.

A spraying station A, into which a prepared male form 40 is indexed by energization of the drive motor 38, includes means for spraying a selected quantity of fibrous particles onto the male form to form a substantially continuous layer. As is more clearly shown in FIG. 4 of the drawing, such spraying station includes a main spray gun 64 that is supplied with fibrous particles 68 enclosed within a reservoir 67, by means of a blower 66 and associated supply duct 65. The reservoir 67 is maintained in a partially filled condition at all times with such particles 68 by means of a feed apron 70 that empties into the interior of the reservoir 67 from a filter drum 71 that removes large and entangled fibres from the particles supplied thereto by a conveyor belt 72 extending beneath a supply hopper 73. A canopy 75, mounted upon an arm 76 pivotally carried upon a main post 77, shrouds the upper portion of the male form and includes auxiliary spray units 79 for coating all portions of the male form that are not accessible to the main spray gun 64. The male form is rotated continuously by its motor 43 while it is in the spray station, whereby the sprayed particles are uniformly deposited thereupon. A power unit 78 controls the position of the arm 76 and lifting of the canopy 75 to allow movement of the male form from the spraying station to the next pressing station B which compacts the particles sprayed on to the male form to form a congruous layer. During such movement of the male form from the spraying station to the compacting station, a protective enclosure 81 that envelops the male form during the spraying thereof, is removed. Such enclosure prevents stray particles from damaging or interfering with the continuous processing of other articles carried upon the processing apparatus.

It will be noted that in the arrangement illustrated in the drawing, three separate pressing stations B, C, and D are provided, each for a different purpose, but each including a pair of frames 83 upon which are mounted fluid pressure responsive cylinders 84 that control the movement of a pair of matrices toward each other. The first pressing station is a compacting station B that includes a pair of compacting matrices 85a, b, which have main body portions 86 and arms 88 conforming identically to the exterior size and shape of the male form. The interior surface 87 of each of these compacting matrices 85a, b is smooth, so as to impart to the layer formed by the fibrous particles upon the male form, a smooth and uniform pressure. It will now be noted that upon actuation of the operating fluid pressure cylinders 84, the smooth surfaced matrices 85a, b will compact the layer formed by the sprayed particles, with the result that the recessed areas of the male form will yield layer areas of greater cross-sectional thickness than the non-recessed portions thereof due to the fact that such recessed areas define a larger cavity between the male and female forms than the non-recessed areas.

Figure 12:
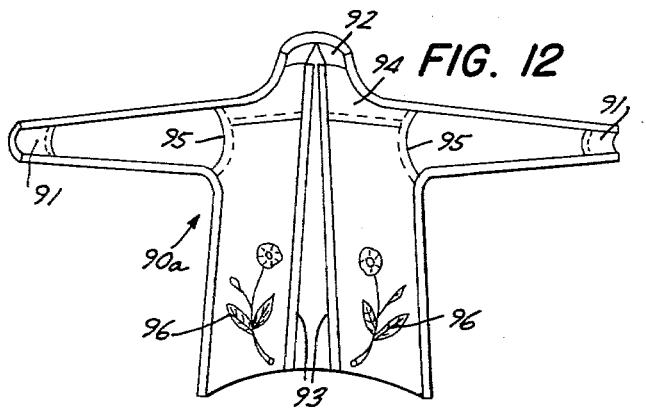
FIG. 12 is a view similar to FIG. 11, of an embossing matrix forming a part of another pressing station of the present invention.

The next pressing station C includes a pair of contouring matrices 90a, b each of which is provided with similar cuff recesses 91, collar recesses 92, shirt front recesses 93, yoke recesses 94, seam recesses 95, and decorative recesses 96, which further impress these areas into the layer carried upon the male form. In addition, the contouring matrices 90a, b (FIG. 12) may also include embossing areas 96 which will impress a design into the compacted layer of fibrous particles carried by the male form.

In order to provide for an automatic operation of the apparatus, a switch 97 mounted adjacent to the inside periphery of the annular frame 32, includes a plunger 98 that is movable into circumferentially spaced apart indents 99 in the frame 32. Thus, each time the plunger 98 is received within one of the recesses 99, the actuating motor 38 of the assembly is deenergized, thus bringing the male forms to rest at their respective processing stations and maintaining such male forms in such processing stations a prescribed period of time, following which the motor 38 is energized to rotate the annular frame 32 to bring each male form into the next sequential station.

A third pressing and trimming station D is provided in order to complete the fabrication of the article before it is removed from the male form. Such pressing-trimming station includes a pair of trimming matrices 100a, b (FIG. 13) each of which is also proivded with a main body portion 101 and outwardly extending sleeve portions 104. The periphery of the main body portion 101 defines a knife edge 102 that cooperates with the corresponding edge of the other matrix to sever any excess material from the part line of the compacted article carried by the male form. The periphery of each sleeve portion 104 also defines a knife edge 105 that cooperates with the corresponding knife edge of the sleeve portions of the cooperating matrix to remove excess material from the layer on the male form. The outer ends of both sleeve portions 104 of each matrix are also provided with knife edges 106 that remove excess material from the cuffs of the garment. A pair of blades 108 carried centrally within the main body portion 101 of each matrix severs excess material from the front of the garment to sever the front opening thereof. In a similar manner, the knife edge 109 carried by the collar portion of the main body member of each matrix trims the collar segment of the garment. It will thus be recognized that upon movement of the trimming matrices 100a, b toward each other, all excess material is removed from the compacted layer of the male form simultaneously.

With reference now to FIGS. 15 to 19 of the drawing, apparatus is shown which may be incorporated in the trimming matrix units of the present invention which will provide for the automatic application of thermoplastic buttons and the formation of buttonholes upon the shirt fronts of the garments. A button guide chute 115 extends between a button feeder 116 and each of the individual button receiving openings 110 in the knife blade portions 108 of the front trimming matrix 100a. Thus, as individual buttons are moved into position adjacent to the shirt front of the garment, an electrode 119 is movable through the button opening 110 of the matrix and into a central socket 120 of the thermoplastic button 117, so as to weld such button on to the shirt front 121 of the garment. The matching blade 108 of the trimming matrix 100a is provided with button-hole openings 111, through which a blade 123 is received for punching an opening 129 in the shirt front 121 of the garment. This blade 123 is mounted centrally within a cup 124 having an interior 125 that is filled with a resin 126 supplied thereto by a supply duct 127. The resin, which is heated, is thus applied around the periphery 128 of the buttonhole 129 formed during the piercing thereof by the blade 123. Such resin forms and reinforces the surrounding area of the buttonhole, as shown in FIG. 17, thus preventing fraying and enhancing the appearance of the garment.

Figure 20:
FIG. 20 is a fragmentary cross-sectional view of ribbing apparatus forming still another part of the present invention.
Figure 21:
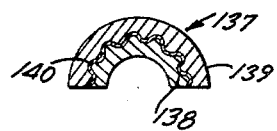
FIG. 21 is a view similar to FIG. 20, showing a slightly modified form of ribbing apparatus.

Various portions of the garment may also be ribbed, as is shown in FIGS. 20 and 21. In FIG. 20 of the drawing, a ribber assembly 131 is shown to include a male member 132 and a female member 133 having cooperating surface areas that define lands 134 and roots 135 in the layer of compacted particles. If desired, such cooperating surface undulations could be formed in the male form 40 and female matrices of the various stations of the present invention. The result of using such an arrangement is that a degree of elasticity is provided between the thinner root areas 135 and the heavier land areas 134, thus simulating ribbing formed by knitted woven fabrics. In the ribbing structure 137 shown in FIG. 21 of the drawing, the undulations of the male and female members 138, 139 produce a ribbed surface 140 of generally uniform cross-sectional thickness, thus providing a lesser degree of elasticity than that possible with the arrangement shown in FIG. 20.

It will be recognized that various types of fibrous particles may be used in carrying out the purposes of the present invention. Various binders may also be used with each of the basic materials employed, all of which may include animal fibers, synthetic fibers, and plant fibers, by themselves and in various combinations. Each of the matrices may also include chilling or heating elements 113, as shown in FIG. 14, in order to facilitate the curing and setting of the various fibrous particles and their binder agents. After the male form is rotated to the handling station E, the finished article may be removed therefrom by retracting the telescoping arm, as illustrated in the drawing, following which the surface of the male form may be treated with a releasing agent before it is rotated into the spraying station A. The removed article is completely pressed, shaped, and blocked, so that it is readily adaptable for automatic wrapping in a packaging machine.

Figure 11:
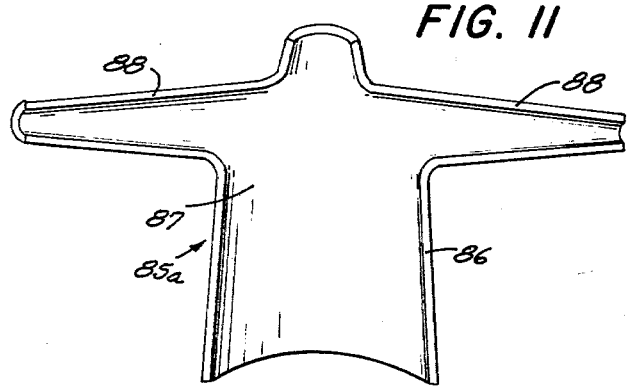
FIG. 11 is a front plan view of the inside of one of the matrices forming a part of the apparatus shown in FIG. 9.
Figure 19:
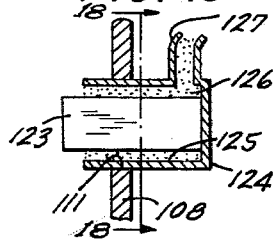
FIG. 19 is a longitudinal cross-sectional view of the apparatus shown in FIG. 18.

Various features of the present invention will now be readily recognized by those skilled in the art. For example, a shirt is usually made from cloth containing various pattern and color combinations derived from a printing or dyeing process employing costly equipment. Also, since the shirt is thus assembled of sewn parts, the finished product often represents a mismatched arrangement of the original pattern. Of course, in more expensive garments, an accurate matching of the garment may be obtained with the resulting increase in cost of labor and wasted material. However, in accordance with the present invention, it is possible to arrange the printing or dyeing on the finished article to contain a given pattern perfectly matched and aesthetically continued over the entire surface. This feature of the present invention is apparent in FIG. 11 of the drawing, wherein the mold component illustrated lends itself to many uses and applications.

For example, this compacting matrix 85a may be provided with raised configurations of a pattern upon its inner surface, which can be made to deposit ink to the compacted garment as in conventional printing methods, whereby the closing of the mold-carrying press would imprint the pattern onto the material covering the core in an exactly matched continuation of the pattern. Also, where a number of different colors are required, repeated printings with different colored inks may be used. A screen printing process may also be employed for this purpose.

A pressure actuated dye apparatus may also be used to force a printing dye against the material mounted upon the core. This pressure apparatus may be mounted to inject the dye upon both the core and matrix sides of the material, which arrangement would provide for a dye saturation action. The degree of penetration, saturation and drying factors would necessarily be determined by the dyestuff formulation. Such saturation dyeing of the material would enhance the appearance, wear, and finish of the material.

While a selected number of treating stations have been specifically disclosed and described, it will be appreciated that this number may be increased or decreased, depending upon the particular number and type of operations to be performed. This invention is equally as well applicable to all other types of garments, accessories, and articles apart from the shirt-type garment specifically described.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. Apparatus for contour-molding non-woven fibrous pliable garments comprising in combination a contoured male form, particle spray means for coating said form with a continuous layer of fibrous particles, compacting means for forming said particles sprayed on to said male form into a congruous layer, trimming means for removing excess matter from said layer to define prescribed shapes and openings, conveyor means sequentially moving said male form from said spray means to said compacting means and to said trimming means, said conveyor comprising an annular frame supported upon a set of wheels, and a motor drivingly connected to said frame for rotating said frame about a central axis, said spray means comprising a spray station, a canopy removably enclosing said male form, a spray gun mounted within said canopy directed toward said male form, fibrous particle supply means supplying particles to said spray gun under pressure, and said male form being drivingly rotatably supported upon said conveyor means for rotation about a vertical axis adjacent to said spray gun.

2. Apparatus for contour molding non-woven fibrous pliable garments as set forth in claim 1, further comprising a plurality of auxiliary spray guns carried by said canopy and directed at remote portions of said male form, and an enclosure removably enveloping said canopy and said male form together with said spray guns mounted therewithin.

3. Apparatus for contour molding non-woven fibrous pliable garments as set forth in claim 2, wherein said compacting means comprises a pair of female matrices having interior surfaces corresponding substantially to the surface configuration of said male form for compressing particles sprayed on to said male form, and said trimming means includes cutting edges on said matrices for removing excess material from said layer carried by said male form.

4. Apparatus for contour molding non-woven fibrous pliable garments as set forth in claim 3, further comprising button fastening means and buttonhole forming means carried by said trimming matrices for attaching buttons to said compacted layer mounted upon said male form and defining buttonholes through matching portions of said layer receiving said buttons therethrough.

5. Apparatus for contour molding non-woven fibrous pliable garments as set forth in claim 3, further comprising button fastening means carried by said trimming means for securing individual buttons to said layer of fibrous particles, and said trimming means including buttonhole forming means for defining button receiving openings in said layer carried by said male form for receiving said buttons therethrough.

References Cited by the Examiner

UNITED STATES PATENTS

| | | | |
|---|---|---|---|
| 768,413 | 8/04 | Wagner | 83—169 |
| 2,633,618 | 4/53 | Moe | 24—202 |
| 2,702,261 | 2/55 | Bacon et al. | 154—101.01 |
| 2,745,160 | 5/56 | Jones. | |
| 2,834,394 | 5/58 | Sharn et al. | 154—1 |
| 2,870,054 | 1/59 | Amos et al. | 154—101 XR |

FOREIGN PATENTS 1,170,213   9/58   France.

EARL M. BERGERT, *Primary Examiner.*

CARL F. KRAFFT, *Examiner.*